US012573576B2

(12) United States Patent
Keyaki et al.

(10) Patent No.: US 12,573,576 B2
(45) Date of Patent: Mar. 10, 2026

(54) X-RAY GENERATING DEVICE COMPRISING AN ELECTRON BEAM GENERATOR TO GENERATE AN ELECTRON BEAM, A TARGET TO GENERATE X-RAYS, AN ECCENTRIC ROTATOR TO ROTATE THE TARGET, AND A DRIVER TO ROTATIONALLY DRIVE THE ECCENTRIC ROTATOR

(71) Applicant: Shimadzu Corporation, Kyoto (JP)

(72) Inventors: Yasuyuki Keyaki, Kyoto (JP); Daisuke Harada, Kyoto (JP); Toshimichi Masaki, Kyoto (JP); Katsuo Yamada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 225 days.

(21) Appl. No.: 18/497,097

(22) Filed: Oct. 30, 2023

(65) Prior Publication Data

US 2024/0212965 A1 Jun. 27, 2024

(30) Foreign Application Priority Data

Dec. 21, 2022 (JP) ................................. 2022-204892

(51) Int. Cl.
*G01N 23/046* (2018.01)
*G01N 23/083* (2018.01)
(Continued)

(52) U.S. Cl.
CPC ............ *H01J 35/10* (2013.01); *G01N 23/046* (2013.01); *G01N 23/083* (2013.01); *G01N 23/087* (2013.01); *H01J 35/064* (2019.05); *H01J 35/101* (2013.01); *H01J 35/147* (2019.05); *H01J 35/153* (2019.05); *H01J 35/26* (2013.01); *H01J 2235/1026* (2013.01)

(58) Field of Classification Search
CPC .. G01N 23/046; G01N 23/083; G01N 23/087; G01N 23/18; H01J 35/02; H01J 35/04; H01J 35/045; H01J 35/06; H01J 35/064; H01J 35/066; H01J 35/08; H01J 35/10; H01J 35/101; H01J 35/14; H01J 35/147; H01J 35/153; H01J 35/16; H01J 35/24; H01J 35/26; H01J 35/30; H01J 35/305; H01J 2235/10; H01J 2235/1026; H01J 2235/1033; H01J 2235/104
USPC ....... 378/10, 15, 16, 19, 125, 136–138, 143, 378/144
See application file for complete search history.

(56) References Cited

U.S. PATENT DOCUMENTS 2,653,260 A * 9/1953 Taylor ..................... H01J 35/26
313/42
4,845,732 A * 7/1989 Michel .................... H01J 35/00
378/119

(Continued)

FOREIGN PATENT DOCUMENTS

JP 2014-154485 A 8/2014

*Primary Examiner* — Allen C. Ho
(74) *Attorney, Agent, or Firm* — Maier & Maier, PLLC

(57) ABSTRACT

An X-ray generating device includes an electron beam generator configured to generate an electron beam; a target configured to generate X-rays in response to the electron beam incident on the target; an eccentric rotator configured to be eccentrically rotated to rotate the target while changing a position of the target; and a driver configured to rotationally drive the eccentric rotator.

8 Claims, 3 Drawing Sheets

(51) Int. Cl.

| | |
|---|---|
| *G01N 23/087* | (2018.01) |
| *H01J 35/06* | (2006.01) |
| *H01J 35/10* | (2006.01) |
| *H01J 35/14* | (2006.01) |
| *H01J 35/26* | (2006.01) |

(56) References Cited

U.S. PATENT DOCUMENTS

| | | | | |
|---|---|---|---|---|
| 4,989,225 A * | 1/1991 | Gupta | G01N 23/046 | 378/10 |
| 5,012,498 A * | 4/1991 | Cuzin | G01N 23/046 | 250/370.15 |
| 5,023,895 A * | 6/1991 | McCroskey | G01N 23/046 | 378/177 |
| 5,119,408 A * | 6/1992 | Little | G01N 23/046 | 378/10 |
| 5,757,885 A * | 5/1998 | Yao | H05G 1/025 | 378/131 |
| 6,041,132 A * | 3/2000 | Isaacs | G01N 23/046 | 600/407 |
| 6,154,521 A * | 11/2000 | Campbell | H01J 35/28 | 378/126 |
| 6,487,274 B2 * | 11/2002 | Bertsche | A61N 5/10 | 378/65 |
| 7,016,465 B2 * | 3/2006 | Kamegawa | G01N 23/046 | 378/19 |
| 7,254,211 B2 * | 8/2007 | Hunt | G01N 23/046 | 378/57 |
| 7,286,630 B2 * | 10/2007 | Holt | G01N 23/046 | 378/20 |
| 7,356,115 B2 * | 4/2008 | Ford | G01N 23/046 | 378/57 |
| 7,775,715 B2 * | 8/2010 | Warner | G01N 23/046 | 378/207 |
| 7,792,242 B2 * | 9/2010 | Kamegawa | G01N 23/046 | 378/207 |
| 9,953,799 B2 * | 4/2018 | Hakoda | H01J 35/04 | |
| 10,705,030 B2 * | 7/2020 | Watanabe | G01N 23/046 | |
| 12,392,737 B2 * | 8/2025 | Caliskan | G01N 23/046 | |

* cited by examiner

X-RAY GENERATING DEVICE COMPRISING AN ELECTRON BEAM GENERATOR TO GENERATE AN ELECTRON BEAM, A TARGET TO GENERATE X-RAYS, AN ECCENTRIC ROTATOR TO ROTATE THE TARGET, AND A DRIVER TO ROTATIONALLY DRIVE THE ECCENTRIC ROTATOR

CROSS-REFERENCE TO RELATED APPLICATIONS

The related application number JP2022-204892, an X-ray generating device and X-rays imaging apparatus, filed Dec. 21, 2022, Keyaki Yasuyuki, Harada Daisuke, Masaki Toshimichi, Yamada Katsuo upon which this patent application is based are hereby incorporated by reference.

BACKGROUND

Field of the Invention

The present invention relates to an X-ray generating device and an X-ray imaging apparatus.

Description of the Background Art

Conventionally, an X-ray generating device including a target is known. Such a device is disclosed in Japanese Patent Laid-Open Publication No. JP 2014-154485, for example.

The above Japanese Patent Laid-Open Publication No. JP 2014-154485 discloses an X-ray generating device including a filament configured to generate an electron beam and a target configured to generate X-rays in response to irradiation of the electron beam. Because a part of the target upon which the electron beam is incident will be damaged with increase of an amount of X-rays generated, in this X-ray generating device, the part of the target upon which the electron beam is incident can be changed by manually moving the target by means of a jig by an operator.

However, in the X-ray generating device disclosed in the above Japanese Patent Laid-Open Publication No. JP 2014-154485, operators are required to manually moving the target by using the jig to change the part of the target upon which the electron beam is incident, and such a work increases a burden on the operators. In particular, in case in which the part of the target upon which the electron beam is incident is necessarily frequently changed, the burden on the operators is very large. For this reason, it is desired to reduce the burden on the operators of changing the part of the target upon which the electron beam is incident.

SUMMARY

The present invention is intended to solve the above problem, and one object of the present invention is to provide an X-ray generating device and an X-ray imaging apparatus capable of reducing a burden on operators of changing a part of a target upon which electron beams are incident.

An X-ray generating device according to a first aspect of the present invention includes an electron beam generator configured to generate an electron beam; a target configured to generate X-rays in response to the electron beam incident on the target; an eccentric rotator configured to be eccentrically rotated to rotate the target while changing a position of the target; and a driver configured to rotationally drive the eccentric rotator.

An X-ray imaging apparatus according to a second aspect of the present invention includes an X-ray generating device; and an X-ray detector configured to detect X-rays emitted from the X-ray generating device, wherein the X-ray generating device includes an electron beam generator configured to generate an electron beam, a target configured to generate X-rays in response to the electron beam incident on the target, an eccentric rotator configured to be eccentrically rotated to rotate the target while changing a position of the target, and a driver configured to rotationally drive the eccentric rotator.

In the X-ray generating device according to the first aspect and the X-ray imaging apparatus according to the second aspect, as described above, an eccentric rotator configured to be eccentrically rotated to rotate the target while changing a position of the target; and a driver configured to rotationally drive the eccentric rotator are provided. According to the present invention, because the target can be moved by the driver configured to rotationally drive the eccentric rotator so that a part of the target upon which electron beams are incident is changed, users do not necessarily manually move the target by using any jig. Consequently, it is possible to reduce a burden on users of changing the part of the target upon which the electron beam is incident.

Also, in a case of a large X-ray imaging apparatus, its X-ray generating device may be located at an inaccessible position to users to manually move the target. According to the present invention, because the target can be moved by the driver configured to rotationally drive the eccentric rotator, even in the case in which the X-ray generating device is located at such an inaccessible position to users to manually move the target, the part of the target upon which electron beams are incident can be changed.

Although it is conceivable that a target is simply rotated to move the target by means of a driver, parts of the target that can be used will be damaged after one revolution of the target, and as a result the target will have a reduced life (target replacement cycle will be short). Contrary to this, the eccentric rotator, which is configured to be eccentrically rotated to rotate the target while changing a position of the target, can disagree a part of the target upon which electron beams are incident after one revolution of the target with a part of the target upon which electron beams are incident at the start. Consequently, dissimilar to the case in which the target is simply rotated, it is possible effectively increase the life of the target (target replacement cycle can be effectively increased).

BRIEF DESCRIPTION OF THE DRAWINGS

FIG. 1 is a schematic diagram showing the entire configuration of an X-ray imaging apparatus according to one embodiment.

FIG. 2 is a schematic diagram showing an X-ray generating device according to the one embodiment.

DETAILED DESCRIPTION

Figure 3:
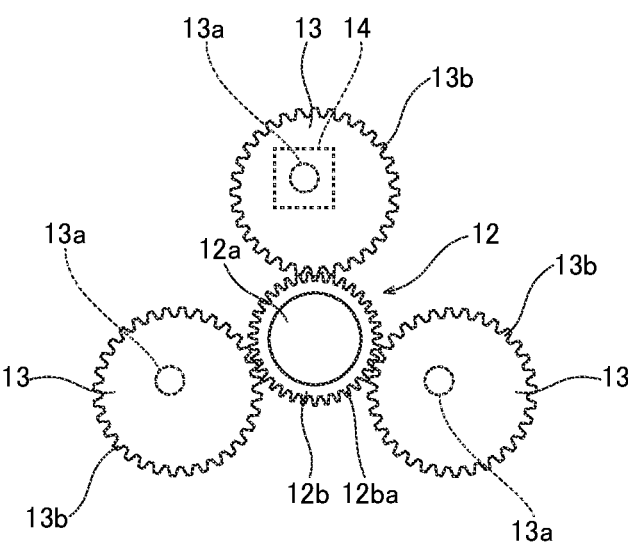
FIG. 3 is a schematic diagram showing a target and eccentric rotators according to the one embodiment.

Embodiments embodying the present invention are hereinafter described on the basis of the drawings.

Overall Configuration of X-Ray Imaging Apparatus

An X-ray imaging apparatus 100 according to one embodiment is now entirely described with reference to FIG. 1.

Figures 1, 2:
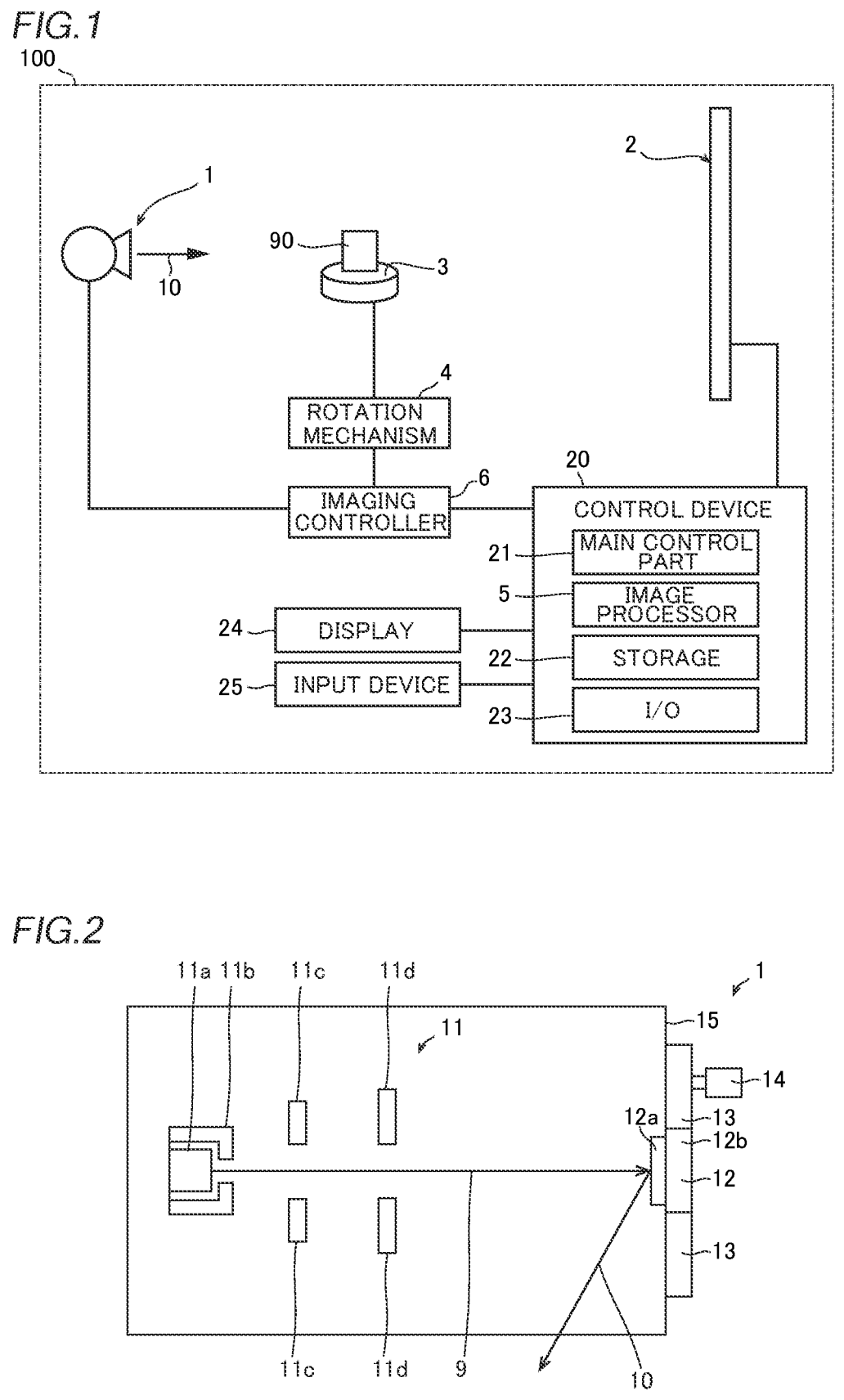

As shown in FIG. 1, the X-ray imaging apparatus 100 is an apparatus configured to capture X-ray CT (Computed Tomography) image of a subject 90. For example the X-ray imaging apparatus 100 according to this embodiment can be used for non-destructive inspection applications. In this case, the subject 90 is a sample as an inspection target.

The X-ray imaging apparatus 100 includes an X-ray generating device 1, an X-ray detector 2, a subject holder 3, rotation mechanism 4, an image processor 5 and an imaging controller 6.

The X-ray generating device 1 is configured to emit X-rays 10 toward the subject 90 arranged on the subject holder 3. The X-ray generating device 1 is configured to generate X-rays 10 when a high voltage is applied. The X-ray generating device 1 faces the X-ray detector 2 with the subject holder 3 being interposed between them. In this embodiment, the X-ray generating device 1, the subject holder 3 and the X-ray detector 2 are arranged in a horizontal direction. The X-ray generating device 1 will be described in detail later.

The X-ray detector 2 is configured to detect X-rays 10 emitted from the X-ray generating device 1. X-rays 10 emitted from the X-ray generating device 1 penetrates the subject 90 and is incident on a detective surface of the X-ray detector 2. The X-ray detector 2 is configured to convert the detected X-rays 10 into electrical signals. Accordingly, an X-ray image representing X-rays 10 that penetrates the subject 90 can be produced. The X-ray detector 2 is a flat panel detector (FPD), for example. The X-ray detector 2 includes a plurality of converters (not shown), and a plurality of pixel electrodes (not shown) arranged on the plurality of converters. The plurality of converters and the plurality of pixel electrodes are arranged in a matrix and spaced at predetermined cycles (pixel pitches) in the detective surface. The detection signals (image signals) of the X-ray detector 2 are transmitted to the image processor 5.

The subject holder 3 is arranged between the X-ray generating device 1 and the X-ray detector 2, and is configured to hold the subject 90. In this embodiment, the subject holder 3 includes a subject stage on which the subject 90 is placed. The subject 90 may be held to the subject holder 3 through a retainer (not shown) configured to retain the subject 90.

The rotation mechanism 4 is configured to rotate the subject holder 3 relative to the X-ray generating device 1 and the X-ray detector 2. Accordingly, the rotation mechanism 4 is configured to change an image-capture angle of the subject 90. The rotation mechanism 4 includes an electric motor (not shown) configured to rotate the subject holder 3 as the subject stage, and a speed reducer (not shown). In this embodiment, a rotating stage of the subject 90 is constructed of the subject holder 3 and the rotation mechanism 4.

The image processor 5 is included in a control device 20. The control device 20 is constructed of, for example, by a PC (personal computer). The control device 20 includes a main control part 21, the image processor 5, a storage 22 and an I/O 23. The control device 20 is connected to a display 24 and an input device 25.

For example, the main control part 21 is constructed of a processor such as CPU (Central Processing Unit), and configured to control a function of setting imaging conditions in the X-ray imaging apparatus 100 and a function of starting/stopping image capture by executing an application program stored in the storage 22.

The image processor 5 is constructed of a processor such as a graphics processing unit (GPU) or a field-programmable gate array (FPGA) configured for image processing, for example.

The image processor 5 acquires a plurality of sets of projected image data corresponding to a plurality of image-capture angles from the X-ray detector 2. The projected image data is data of X-ray images acquired corresponding to the plurality of image-capture angles. The image processor 5 is configured to produce CT images based on projected image data acquired corresponding to a plurality of images. Image processor 5 applies reconstruction processing to a plurality of sets of projected image data corresponding to image-capture angles of 360 degrees to generate CT images. The CT images are images representing a three-dimensional structure of the subject 90, and reconstructed from a plurality of X-ray images captured at various image-capture angles (projected image data) based on calculation processing. The CT images can be cross sections and three-dimensional stereoscopic images etc. of the subject 90.

The storage 22 can include a volatile storage and a non-volatile storage. The storage 22 stores a program, various setting information about CT imaging of the X-ray imaging apparatus 100, etc. The storage 22 stores projected image data corresponding to a plurality of images acquired, and CT images generated based on the projected image data.

The I/O 23 is constructed of various interfaces configures to receive and provide signals from and to the control device 20. The I/O 23 is connected to the display 24 and the input device 25. For example, the display 24 is a liquid crystal display. The input device 25 includes a keyboard and a computer mouse. The image processor 5 acquires detection signals (image signals) from the X-ray detector 2 through the I/O 23. The main control part 21 can transmit instructions for starting and stopping image capture to the imaging controller 6 through the I/O 23.

The imaging controller 6 is configured control operations of the X-ray generating device 1. Also, the imaging controller 6 is configured control operations of the rotation mechanism 4. The imaging controller 6 includes a controller configured to control the X-ray generating device 1, a controller configured to control the rotation mechanism 4, etc.

Configuration of X-Ray Generating Device

As shown in FIG. 2, the X-ray generating device 1 includes an electron beam generator 11, a target 12, eccentric rotators 13, a driver 14 and a vacuum chamber 15. The electron beam generator 11 is configured to generate an electron beam 9. Specifically, the electron beam generator 11 includes an electron-beam emitter 11a as a cathode, a grid electrode 11b, an anode 11c and an electron lens 11d. The electron-beam emitter 11a, the grid electrode 11b, the anode 11c, the electron lens 11d, and a part of the target 12 that can generate X-rays are accommodated in a part of the vacuum chamber 15 brought in a vacuum.

The X-ray generating device 1 is an open-type device, which is configured to be able to relieve the vacuum in the vacuum chamber 15 to perform various types of maintenance dissimilar to closed-type devices. For example, a filament of the electron beam generator 11 and the target 12 can be replaced in the X-ray generating device 1.

The electron-beam emitter 11*a* is configured to emit the electron beam 9 toward the target 12. The electron-beam emitter 11*a* can generate the electron beam 9 when a voltage is applied from a power supply (not shown). Specifically, when a voltage is applied between the electron-beam emitter 11*a* and the target 12, the electron-beam emitter 11*a* generates the electron beam 9 with which the target 12 is irradiated. X-rays 10 are generated from the target 12 in response to the incident electron beam 9 from the electron-beam emitter 11*a*. The electron-beam emitter 11*a* is constructed of a thermionic-emission type electron source. For example, the electron-beam emitter 11*a* includes a filament formed of a heavy metal in a coil or foil form. For example, the filament is formed of tungsten. The target 12 is grounded by connection to a reference potential (0 V).

The grid electrode 11*b* is configured to control a current amount of electron beam 9. The grid electrode 11*b* is arranged in proximity to the electron-beam emitter 11*a*.

The anode 11*c* is configured to accelerate the electron beam 9 emitted by the electron-beam emitter 11*a* in accordance with a voltage is applied to the anode 11*c*. The anode 11*c* is arranged between the electron-beam emitter 11*a* and the target 12.

The electron lens 11*d* is configured to converge the electron beam 9 emitted by the electron-beam emitter 11*a*. The electron lens 11*d* is arranged between the electron-beam emitter 11*a* and the target 12.

The target 12 is configured to generate the X-rays 10 in response to the electron beam 9 incident on the target. Specifically, the target 12 has an X-ray emitter 12*a* configured to generate X-rays in response to the electron beam 9 incident on the X-ray emitter 12*a*. A part of the X-ray emitter 12*a* that is configured to generate X-rays is formed of a metal such as tungsten. The target 12 is a reflection type target. The reflection type target refers to a target configured to emit X-rays 10 in a direction opposite to an incoming direction of the electron beam 9.

If the X-ray emitter 12*a* of the target 12 is continuously irradiated with the electron beam 9, a surface of the target 12 melts so that the surface of the X-ray emitter 12*a* is damaged. If the surface of the X-ray emitter 12*a* is damaged, luminance distribution of X-rays 10 will be uneven or resolving power will be reduced so that quality of X-ray images generated based on the X-rays 10 will deteriorate. To address this, in order to such deterioration of X-ray images due to the damage of the surface of the X-ray emitter 12*a*, it is necessary to change a part of the X-ray emitter 12*a* of the target 12 upon which the electron beam 9 is incident.

As shown in FIGS. 2 and 3, the X-ray generating device 1 includes the eccentric rotators 13 and the driver 14. The eccentric rotators 13 are configured to be eccentrically rotated to rotate the target 12 while changing a position of the target 12. The eccentric rotator 13 is configured to rotate about a rotation center 13*a*, which deviates from a center of the eccentric rotator 13 having a circular shape. The rotation center 13*a* deviates in two directions orthogonal to each other from the center of the circular-shaped eccentric rotator 13. The driver 14 is configured to rotationally drive the eccentric rotator 13. The driver 14 is an electric motor.

In this embodiment, a plurality of eccentric rotators 13 are provided. Specifically, the number of the eccentric rotators

13 is three. The plurality of (three) eccentric rotators 13 are spaced away at substantially an even angular interval (120-degree interval) in a circumference of the target 12. Also, the plurality of (three) eccentric rotators 13 are spaced away at substantially an even distance away from the center of target 12 in radial directions. The target 12 is held by the plurality of eccentric rotators 13. An axis of each eccentric rotator 13 deviates by substantially a common distance in substantially a common direction from its geometric center. In other words, the rotation center 13*a* of each of the plurality of eccentric rotators 13 deviates by substantially the same distance in substantially the same direction from the center of the eccentric rotator 13.

In this embodiment, a predetermined eccentric rotator (the eccentric rotator 13 arranged on the upper side in FIG. 3), which is one of the plurality of eccentric rotators 13, is configured to be rotationally driven by the driver 14. The other eccentric rotators (the two eccentric rotators 13 arranged on the lower side in FIG. 3), which are the other of the plurality of eccentric rotators 13, are follower rotators configured to be rotated when the target 12 is rotated by the predetermined eccentric rotator 13. The predetermined eccentric rotator 13 serves as a driving rotator, while the other eccentric rotators 13 serve as follower rotators. The driver 14 is coupled to the predetermined eccentric rotator 13 so that the predetermined eccentric rotator 13 rotates about the rotation center 13*a*.

In this embodiment, each eccentric rotator 13 includes an eccentric gear. The eccentric rotator 13 has a circular shape, and teeth 13*b* are formed on its outer periphery. The teeth 13*b* are formed on the entire outer periphery of the eccentric rotator 13. The target 12 includes a gear 12*b* meshing with the eccentric rotator 13 as an eccentric gear. The gear 12*b* has teeth 12*ba* on its the outer periphery. The teeth 12*ba* are formed on the entire outer periphery of the gear 12*b*. The target 12 is rotated while the teeth 13*b* of the plurality of eccentric rotators 13 constantly mesh with the teeth 12*ba* of the gear 12*b* of the target 12. In other words, when the predetermined eccentric rotator 13 is rotated by the driver 14, the target 12 is rotated, and the other eccentric rotators 13 are rotated through the target 12.

In this embodiment, the teeth number of the eccentric rotator 13 as the eccentric gear is different from the teeth number of the gear 12*b* of the target 12. Although the teeth number of the gear 12*b* of the target 12 is greater than the teeth number of the eccentric rotator 13 as the eccentric gear in this embodiment, the teeth number of the eccentric rotator 13 as the eccentric gear may be greater than the teeth number of the gear 12*b* of the target 12.

Figure 4:
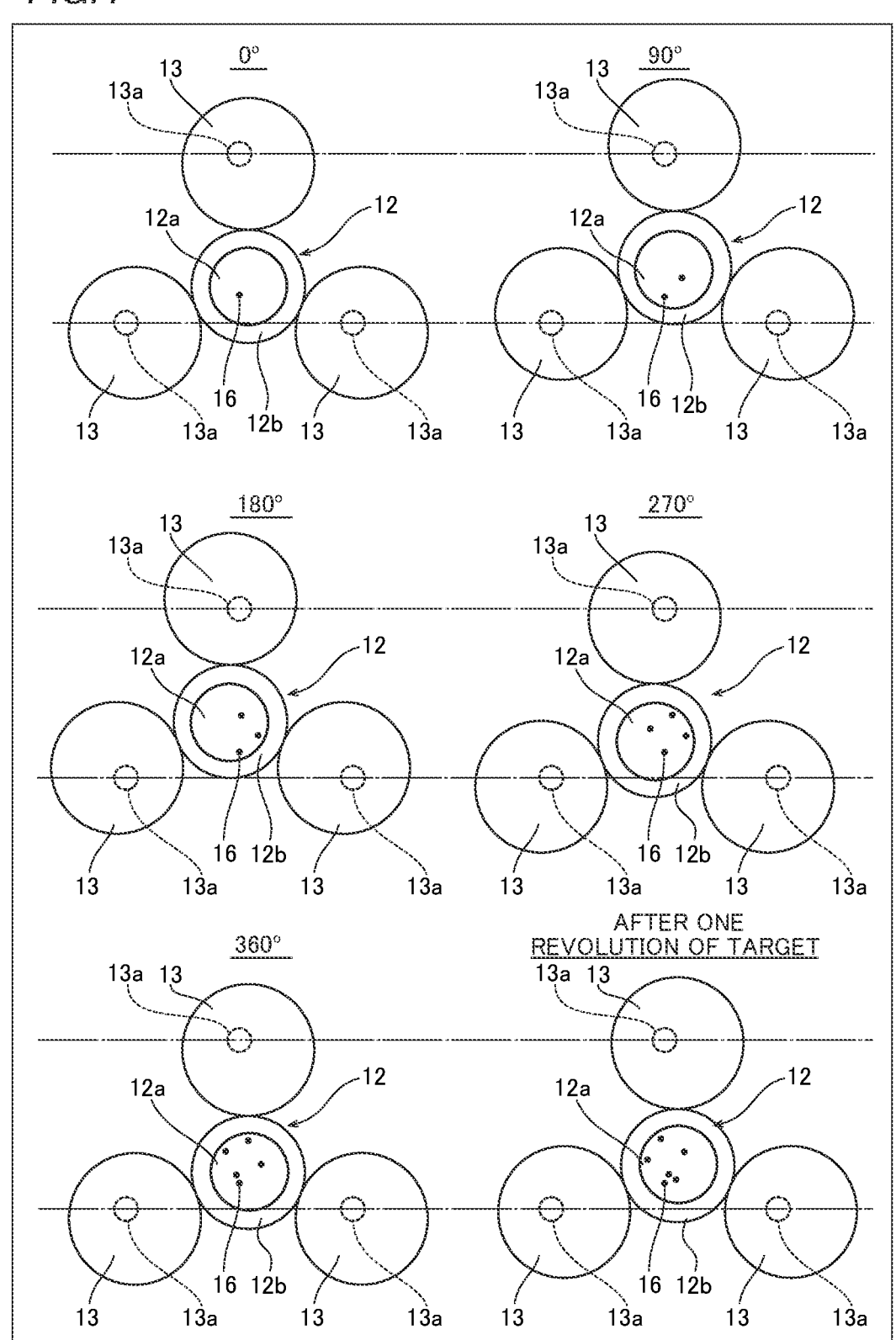
FIG. 4 is a schematic diagram illustrating change of an irradiation position of electron beams in the one embodiment.

As shown in FIG. 4, when the predetermined eccentric rotator 13 is rotated by the driver 14, the other eccentric rotators 13 are rotated through the target 12. The predetermined eccentric rotator 13 and other eccentric rotators 13 (i.e., all of the plurality of eccentric rotators 13) eccentrically rotate with the same phase. Correspondingly, the target 12 is rotated while changing its position to follow eccentric rotation of the plurality of eccentric rotators 13 with being held at a center of the plurality of eccentric rotators 13. Specifically, while a position of the target 12 changes in a plane parallel to the surface of the X-ray emitter 12*a* upon which the electron beam 9 is incident in accordance with the eccentric rotation of the plurality of eccentric rotators 13, the target 12 rotates in this plane. A rotation axis (rotation center) of the target 12 is unfixed. In FIG. 4, teeth of the target 12 and the eccentric rotator 13 are omitted for sake of illustration.

When the eccentric rotators 13 are eccentrically rotated so that the target 12 is rotated while changing the position of the target 12, a position of the target 12 relative to an irradiation position of the electron beam 9 correspondingly changes. Correspondingly, a part 16 of the target 12 upon which the electron beam 9 is incident changes. For this reason, even if a part of the surface of the X-ray emitter 12a is damaged, movement of the target 12 by the eccentric rotator 13 allows the electron beam 9 to strike another part of surface of X-ray emitter 12a that is not damaged.

Dissimilar to this embodiment, in a case in which the target 12 is rotated at a fixed position, a part 16 of the target 12 upon which the electron beam 9 is incident after one revolution of the target 12 agrees with a part of the target upon which the electron beams are incident at the start (at zero degree). Contrary to this, according to this embodiment, because rotation of the target 12 while changing a position of the target 12 deviates a position of the target 12 after one revolution of the target 12 from a position of the target 12 at the start, a part of the target 12 upon which the electron beam 9 is incident after one revolution of the target 12 can disagree with a part of the target 12 upon which the electron beam 9 is incident at the start. Accordingly, a large area of the target 12 can be used.

Note that, although parts 16 of the target upon which electron beams 9 are incident are shown corresponding to every 90-degree rotation of the eccentric rotator 13 in FIG. 4 for ease of understanding, the eccentric rotator 13 is not rotated by 90 degrees when one part 16 of the target upon which electron beams is changed to another part. In a case in which the teeth number of the gear 12b of the target 12 is greater than the teeth number of the eccentric gear 13, the target 12 has rotated more than one turn (one revolution) when the eccentric rotators 13 are rotated one turn as shown in FIG. 4, but in a case in which the teeth number of the eccentric gear 13 is greater than the teeth number of the gear 12b of the target 12, the target 12 is rotated one turn before the eccentric rotators 13 are rotated one turn dissimilar to the case of FIG. 4. Also, in the latter case, a part 16 of the target 12 upon which the electron beam 9 is incident after one revolution of the target 12 can disagree with a part 16 of the target 12 upon which electron beam 9 is incident at the start.

Also, the number of revolutions of the target 12 that provides agreement between parts 16 of the target 12 upon which the electron beam 9 is incident at the start and after one revolution of the target 12 is determined by a least common multiple of the teeth number of the eccentric rotator 13 and the teeth number of the gear 12b of the target 12. Specifically, a value obtained by dividing the least common multiple of the teeth number of the eccentric rotator 13 and the teeth number of the gear 12b of the target 12 by the teeth number of the gear 12b of the target 12 corresponds to the number of revolutions of the target 12 that provides agreement between parts 16 of the target 12 upon which the electron beam 9 is incident at the start and after one revolution of the target 12. For this reason, the number of revolutions of the target 12 that provides agreement between parts 16 of the target 12 upon which the electron beam 9 is incident at the start and after one revolution of the target 12 is increased with increase of the least common multiple of the teeth number of the eccentric rotator 13 and the teeth number of the gear 12b of the target 12 so that the target 12 will correspondingly have a longer life. From this viewpoint, the least common multiple of the teeth number of the eccentric rotator 13 and the teeth number of the gear 12b of the target 12 is preferably large.

The imaging controller 6 controls a function of moving the target 12 by rotationally driving the eccentric rotator 13 by means of the driver 14 when predetermined conditions are satisfied. For example, the imaging controller 6 can rotationally drive the eccentric rotator 13 by a predetermined rotation amount by means of the driver 14 to move the target 12 by a positional change amount and a rotation amount corresponding to the predetermined rotation amount if an accumulative time period in which the X-ray generating device 1 generate X-rays 10 becomes greater than a predetermined time period. Also, the imaging controller 6 can rotationally drive the eccentric rotator 13 by a predetermined rotation amount by means of the driver 14 to move the target 12 by a positional change amount and a rotation amount corresponding to the predetermined rotation amount if a deterioration degree (blurring degree) of an X-ray image generated by the image processor 5 becomes greater than a predetermined deterioration degree (blurring degree).

Advantages of the Embodiment

In this embodiment, the following advantages are obtained.

In the X-ray generating device according to this embodiment, as described above, an eccentric rotator 13 configured to be eccentrically rotated to rotate a target 12 while changing a position of the target 12; and a driver 14 configured to rotationally drive the eccentric rotator 13 are provided. According to the present invention, because the target 12 can be moved by the driver 14 configured to rotationally drive the eccentric rotator 13 so that a part of the target 12 upon which an electron beam 9 is incident is changed, users do not necessarily manually move the target 12 by using any jig. Consequently, it is possible to reduce a burden on users of changing the part of the target 12 upon which the electron beam 9 is incident.

Also, in a case of a large X-ray imaging apparatus 100, its X-ray generating device 1 may be located at an inaccessible position to users to manually move the target 12. According to the present invention, because the target 12 can be moved by the driver 14 configured to rotationally drive the eccentric rotator 13, even in the case in which the X-ray generating device 1 is located at such an inaccessible position to users to manually move the target 12, the part of the target 12 upon which the electron beam 9 is incident can be changed.

Although it is conceivable that a target 12 is simply rotated to move the target 12 by means of a driver 14, parts of the target 12 that can be used will be damaged after one revolution of the target 12, and as a result the target 12 will have a reduced life (target 12 replacement cycle will be short). Contrary to this, the eccentric rotator 13, which is configured to be eccentrically rotated to rotate the target 12 while changing a position of the target 12, can disagree a part of the target 12 upon which the electron beam 9 is incident after one revolution of the target 12 with a part of the target 12 upon which the electron beam 9 is incident at the start. Consequently, dissimilar to the case in which the target 12 is simply rotated, it is possible effectively increase the life of the target 12 (target 12 replacement cycle can be effectively increased).

In a case of an X-ray generating device 1 is a closed-type device in which a high voltage is applied to a target 12 (the target 12 has a high voltage) dissimilar to this embodiment, if a driver 14 configured to rotationally drive the eccentric rotator 13 is arranged in proximity to the target 12, an electrically insulating structure is necessarily arranged between the target 12 and the driver 14. Contrary to this, because the X-ray generating device 1 according to this embodiment is an opened-type device in which the target 12 is grounded (the target 12 is 0 V), even if the driver 14 configured to rotationally drive the eccentric rotator 13 is arranged in proximity to the target 12, an electrically insulating structure is not required to be arranged between the target 12 and the driver 14. Consequently, the structure of the X-ray generating device can be prevented from becoming complicated.

In this embodiment, as discussed above, a plurality of eccentric rotators 13 are provided; the plurality of eccentric rotators 13 are spaced away at an even angular interval in a circumference of the target 12; and the target 12 is held by the plurality of eccentric rotators 13. Here, the "even angular interval" is used in a broad sense to include not only completely even angular interval but also angular intervals slightly deviated from the completely even angular interval. Accordingly, because the target 12 can be moved by the plurality of eccentric rotators 13 to follow the eccentric rotation of the plurality of eccentric rotators 13 while the target 12 is constantly held by the plurality of eccentric rotators 13, it is possible to prevent the eccentric rotator 13 from being brought out of contact with the target 12, in other words, from being brought in idle depending on a rotational position of the eccentric rotator 13. Because the eccentric rotator 13 can be prevented from being brought in idle, it is also possible to prevent the driver 14, which is configured to rotationally drive the eccentric rotator 13, from being brought in idle.

In this embodiment, as discussed above, an axis of each of the plurality of eccentric rotators 13 deviates by a common distance in a common direction from its geometric center. Here, the "common direction" is used in a broad sense to include not only completely the same direction but also directions slightly deviated from completely the same direction. Also, the "common distance" is used in a broad sense to include not only completely the same distance but also distances slightly deviated from completely the same distance. Accordingly, the target 12 can be easily constantly held by the plurality of eccentric rotators 13 when moved by the plurality of eccentric rotators 13, the eccentric rotator 13 can be easily prevented from being brought in idle, and the driver 14 can be easily prevented from being brought in idle.

In this embodiment, as discussed above, the number of the eccentric rotators 13 is three. Accordingly, because the target 12 can be moved by a minimum number of eccentric rotators 13 to follow the eccentric rotation of the plurality of eccentric rotators 13 while the target 12 is held by the plurality of eccentric rotators 13, it is possible to prevent the eccentric rotator 13 and the driver 14 from being brought in idle, and to prevent the structure of the X-ray generating device from becoming complicated.

In this embodiment, as discussed above, a predetermined eccentric rotator 13 in the plurality of eccentric rotators 13 is configured to be rotationally driven by the driver 14, and the other eccentric rotators 13 in the plurality of eccentric rotators 13 are follower rotators configured to be rotated when the target 12 is rotated by the predetermined eccentric rotator 13. According to this configuration, because the driver 14, which is provided only to the predetermined eccentric rotator 13, can rotate all the plurality of eccentric rotators 13, the structure of the X-ray generating device can be simplified as compared with a case in which each of the plurality of eccentric rotators 13 is provided with their corresponding driver 14.

In this embodiment, as discussed above, the eccentric rotator 13 includes an eccentric gear; and the target 12 includes a gear 12b meshing with the eccentric rotator 13 as an eccentric gear. According to this configuration, because power can be transferred between the eccentric rotators 13 and the target 12 by the mesh between the eccentric rotator 13 as the eccentric gear and the gear 12b of the target 12, no slip occurs between the eccentric rotator 13 and the target 12 dissimilar to a case in which power is transferred between pulley type eccentric rotators 13 and a pulley type target 12. As a result, power can be reliably transferred between the eccentric rotator 13 and the target 12. Note that, in a case in which a sealing member such as an O-ring is provided to the target 12 to seal the target 12 for vacuum, the sealing member will produce a frictional force when the target 12 is rotated, and a certain large amount of power is correspondingly required to rotate the target 12. In this case, because slip is likely to occur between the eccentric rotator 13 and the target 12, the mesh between the eccentric rotator 13 as the eccentric gear and the gear 12b of the target 12 is very effective at transferring power between the eccentric rotators 13 and the target 12.

In this embodiment, as discussed above, the teeth number of the eccentric rotator 13 as the eccentric gear is different from the teeth number of the gear 12b of the target 12. Accordingly, it is possible to easily provide a configuration that can disagree a part of the target 12 upon which the electron beam 9 is incident after one revolution of the target 12 with a part of the target 12 upon which the electron beam 9 is incident at the start.

Modified Embodiment

Note that the embodiment disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

While the example in which the target is a reflection type target has been shown in the aforementioned embodiment, the present invention is not limited to this. In the present invention, the target may be a transmission type target. In such a transmission type target, when an electron beam is incident on one surface of the target, X-rays are emitted from another surface of the target so that the X-rays penetrate the target.

While the example in which the number of the eccentric rotators is three has been shown in the aforementioned embodiment, the present invention is not limited to this. In the present invention, one, two, or four or more eccentric rotators may be provided. Note that, from a point of view preventing slip between the eccentric rotator and the driver, three or more eccentric rotators are preferably provided.

While the example in which all of the plurality of eccentric rotators are an eccentric gear has been shown in the aforementioned embodiment, the present invention is not limited to this. In the present invention, some of the plurality of eccentric rotators may be a pulley-type eccentric rotator, which does not have teeth. For example, an eccentric rotator connected to the driver in a plurality of eccentric rotators may be an eccentric gear, and the other eccentric rotators in the plurality of eccentric rotators may be a pulley-type eccentric rotator. In this case, the pulley type eccentric rotators can be configured to eccentrically rotate to thrust the target toward the eccentric rotator as the eccentric gear so that the eccentric rotator 13 and the driver 14 can be prevented from being brought in idle. Alternatively, all of the plurality of eccentric rotators may be a pulley-type eccentric rotator, which does not have teeth.

While the example in which the driver is provided only to the predetermined eccentric rotator in the plurality of eccentric rotators has been shown in the aforementioned embodiment, the present invention is not limited to this. In the present invention, the driver may be provided to each of the plurality of eccentric rotators.

While the example in which CT images are produced based on projected image data acquired corresponding to a plurality of images has been shown in the aforementioned embodiment, the present invention is not limited to this. In the present invention, a simple X-ray image may be produced based on projected image data.

MODES

The aforementioned exemplary embodiment will be understood as concrete examples of the following modes by those skilled in the art.

Mode Item 1

An X-ray generating device includes an electron beam generator configured to generate an electron beam; a target configured to generate X-rays in response to the electron beam incident on the target; an eccentric rotator configured to be eccentrically rotated to rotate the target while changing a position of the target; and a driver configured to rotationally drive the eccentric rotor.

Mode Item 2

The X-ray generating device according to mode item 1, wherein a plurality of eccentric rotators are provided as the eccentric rotator; the plurality of eccentric rotators are spaced away at substantially an even angular interval in a circumference of the target; and the target is held by the plurality of eccentric rotators.

Mode Item 3

The X-ray generating device according to mode item 2, wherein an axis of each of the plurality of eccentric rotators deviates by a common distance in a common direction from a geometric center of eccentric rotator.

Mode Item 4

The X-ray generating device according to mode item 2 or 3, wherein the number of the eccentric rotators is three.

Mode Item 5

The X-ray generating device according to any of mode items 2 to 4, wherein a predetermined eccentric rotator(s) in the plurality of eccentric rotators is/are configured to be rotationally driven by the driver; and the other eccentric rotator(s) in the plurality of eccentric rotators is/are a follower rotator(s) configured to be rotated when the target is rotated by the predetermined eccentric rotator(s).

Mode Item 6

The X-ray generating device according to any of mode items 1 to 5, wherein the eccentric rotator includes an eccentric gear; and the target includes a gear meshing with the eccentric gear.

Mode Item 7

The X-ray generating device according to mode item 6, wherein the teeth number of the eccentric gear is different from the teeth number of the gear of the target.

Mode Item 8

An X-ray imaging apparatus includes an X-ray generating device; and an X-ray detector configured to detect X-rays emitted from the X-ray generating device, wherein the X-ray generating device includes an electron beam generator configured to generate an electron beam, a target configured to generate the X-rays in response to the electron beam incident on the target, an eccentric rotator configured to be eccentrically rotated to rotate the target while changing a position of the target, and a driver configured to rotationally drive the eccentric rotor.

The invention claimed is:

1. An X-ray generating device comprising:
an electron beam generator configured to generate an electron beam;
a target configured to generate X-rays in response to the electron beam incident on the target;
at least one eccentric rotator configured to be eccentrically rotated to rotate the target while changing a position of the target; and
a driver configured to rotationally drive the at least one eccentric rotator.

2. The X-ray generating device according to claim 1, wherein the at least one eccentric rotator comprises: a plurality of eccentric rotators;
the plurality of eccentric rotators is away at an even angular interval in a circumference of the target; and
the target is held by the plurality of eccentric rotators.

3. The X-ray generating device according to claim 2, wherein an axis of each of the plurality of eccentric rotators deviates by a common distance in a common direction from a geometric center of the plurality of eccentric rotators.

4. The X-ray generating device according to claim 2, wherein the plurality of eccentric rotators comprises three eccentric rotators.

5. The X-ray generating device according to claim 2, wherein
a predetermined eccentric rotator in the plurality of eccentric rotators is configured to be rotationally driven by the driver; and
other eccentric rotator(s) in the plurality of eccentric rotators is/are a follower rotator(s) configured to be rotated when the target is rotated by the predetermined eccentric rotator.

6. The X-ray generating device according to claim 1, wherein each of the at least one eccentric rotator includes an eccentric gear; and the target includes a gear meshing with the eccentric gear of each of the at least one eccentric rotator.

7. The X-ray generating device according to claim 6, wherein a number of teeth of each of the at least one eccentric gear is different from a number of teeth of the gear of the target.

8. An X-ray imaging apparatus comprising:
an X-ray generating device; and
an X-ray detector configured to detect X-rays emitted from the X-ray generating device, wherein
the X-ray generating device includes:
an electron beam generator configured to generate an electron beam, a target configured to generate the X-rays in response to the electron beam incident on the target, an eccentric rotator configured to be eccentrically rotated to rotate the target while changing a position of the target, and a driver configured to rotationally drive the eccentric rotor.

* * * * *